United States Patent [19]

Kopp

[11] Patent Number: 4,932,809
[45] Date of Patent: Jun. 12, 1990

[54] LOST MOTION SPLINED COUPLING DEVICE

[75] Inventor: Norman L. Kopp, Caledonia, Ill.

[73] Assignee: Sundstrand Corporation, Rockford, Ill.

[21] Appl. No.: 341,626

[22] Filed: Apr. 21, 1989

[51] Int. Cl.[5] .............................................. B25G 3/28
[52] U.S. Cl. .................................. 403/359; 403/298; 403/1
[58] Field of Search .................... 403/298, 359, 13, 1; 464/160

[56] References Cited

U.S. PATENT DOCUMENTS

| | | |
|---|---|---|
| 2,093,955 | 9/1937 | Clark . |
| 2,297,390 | 9/1942 | Burger . |
| 2,696,124 | 12/1954 | Flowers et al. ............... 403/359 X |
| 2,821,277 | 1/1958 | Hughes . |
| 2,885,232 | 5/1959 | Eberly . |
| 2,926,034 | 2/1960 | Weaver . |
| 3,154,181 | 10/1964 | Sigg . |
| 3,197,216 | 7/1965 | Jackson . |
| 3,335,580 | 8/1967 | Simpson . |
| 3,373,625 | 3/1968 | Keller . |
| 3,378,122 | 4/1968 | Funiciello . |
| 3,408,830 | 11/1968 | Sutaruk et al. .................... 464/97 |
| 3,433,338 | 3/1969 | Clements . |
| 3,504,776 | 4/1970 | Misenti . |
| 3,589,488 | 7/1969 | Clements . |
| 3,935,934 | 3/1976 | Norberg . |
| 4,098,381 | 7/1978 | Mueller et al. . |
| 4,115,022 | 9/1978 | Orain . |
| 4,303,149 | 12/1981 | Lech, Jr. . |
| 4,473,317 | 9/1984 | Bolang . |
| 4,586,592 | 5/1986 | Mori . |
| 4,601,601 | 7/1986 | Morris . |
| 4,615,422 | 10/1986 | Thebert . |

Primary Examiner—Andrew V. Kundrat
Attorney, Agent, or Firm—Antonelli, Terry, Stout & Kraus

[57] ABSTRACT

A coupling device for coupling and decoupling first and second coaxial members comprises an annular member which is supported coaxially on one of the first and second members by means of a bi-directional lost motion connection so as to permit relative rotation of the annular member and the one of the first and second members about the common axis back and forth between first and second positions. A mechanism is provided for automatically adjusting the relative rotational position of the annular member and the one of the first and second members to a position midway between the first and second positions when the first and second members are decoupled, thereby insuring that bi-directional lost rotational motion can be attained during a subsequent coupling operation. The coupling device permits the correction of misalignment of splines on the coupling device and the other of the first and second members to be coupled.

14 Claims, 2 Drawing Sheets

LOST MOTION SPLINED COUPLING DEVICE

TECHNICAL FIELD

The present invention relates to a coupling device and arrangement and a method employing the same for coupling and decoupling first and second coaxial members. In particular, the coupling device, arrangement and method are useful for coupling splines where interference may be experienced between the teeth of the two splines being coupled.

BACKGROUND ART

It is often desirable in power transmitting equipment to couple and decouple two shafts. This may be accomplished by sliding an internally-splined collar over its mating externally-splined shaft. To assist the mesh, the leading edge of each spline is usually pointed or rounded to guide the internal spline past the external spline. But some relative rotation is also necessary unless the splines are lined up before engagement. This relative rotation is preferably just enough to allow one tooth to slide past another, since any rotation in excess of this results in unnecessary backlash.

DISCLOSURE OF INVENTION

An object of the invention is to provide a coupling device, arrangement and method employing the same for coupling and decoupling and second coaxial, splined members which eliminated the possibility that the teeth of the splines of the respective members will bind during coupling. More particularly, an object of the invention is to provide an improved coupling device, arrangement and method of coupling employing the same, which insure that the respective teeth of the members being coupled move into the interstices of the teeth of the other component during coupling.

These and other objects are obtained by the coupling device of the invention for coupling and decoupling first and second coaxial members. The coupling device comprises an annular member, means for supporting the annular member coaxially on one of the first and second coaxial members adapted to be coupled so as to permit relative rotation of the annular member and the one of the first and second members back and forth between first and second positions, and means for automatically adjusting the relative rotational position of the annular member and the one of the first and second members to a position midway between the first and second positions when the first and second members are decoupled, thereby insuring the possibility of bi-directional movement during a subsequent coupling operation. Thus, binding of the first and second members during coupling can be avoided.

In a disclosed, preferred form of the invention the means for supporting supports the annular member on the outer periphery of the one of the first and second members. Alternatively, the annular member could be supported on an inner periphery of the one of the first and second members. The means for supporting further comprises an annular centering surface on the one of the first and second members and a cooperating surface on the annular member, as well as means for axially fixing the position of the annular member with respect to the one of the first and second members.

The annular member is formed with splined teeth for coupling with splined teeth of the other of the first and second members. In order that the splined teeth of the annular member and the other of the coupling members not bind during coupling, the distance between the first and second positions is at least equal to the width of the splined teeth. Accordingly, with the annular member positioned midway between the first and second positions when the first and second members are decoupled, sufficient bi-directional movement or relative rotation of the annular member with respect to the one of the first and second members is possible to affect coupling without binding of the splined teeth.

The means for supporting according to the invention further comprises a plurality of recesses formed about the circumference of the one of the annular member and one of the first and second members, and a plurality of teeth provided on the other of the annular member and the one of the first and second members, which teeth are received in the recesses with clearance to permit the relative rotation between the first and second positions. The recesses and teeth are portions of cooperating splines in the disclosed embodiment.

The means for automatically adjusting the relative rotational position of the annular member and the one of the first and second members to a position midway between the first and second positions when the first and second members are decoupled comprises, in the illustrated embodiment, at least one v-shaped ramp formed in one of the annular member and the one of the first and second members and at least one cooperating ball resiliently biased toward the ramp and supported in the other of the annular member and the one of the first and second members. This arrangement resiliently biases the annular member in the midway position when the first and second members are decoupled, but permits relative, bidirectional movement between the annular member and the one of the first and second members during coupling for proper alignment of splined teeth on the annular member and the other of the first and second members during coupling. In the disclosed form of the invention, the one of the first and second members is a drive shaft and the other is a sliding collar adapted to be moved axially with respect to the shaft and the annular member supported thereon for coupling and decoupling the first and second members. The sliding collar is, in turn, nonrotatably coupled to a stationary shaft so that the drive shaft and stationary shaft can be coupled with the coupling device.

Further, an arrangement of the invention for coupling and decoupling first and second coaxial members comprises first and second members arranged coaxially and adapted to me coupled and decoupled to one another by way of the coupling device of the invention. The coupling device is connected to one of the first and second members and adapted to be coupled and decoupled with the other member for coupling and decoupling the members to one another. Means are provided for effecting relative axial movement of the other member on the one hand and the coupling device and the one member on the other hand, for coupling and decoupling the members to one another by way of the coupling device. And means are provided for allowing bidirectional lost rotational motion between the coupling device and the one member about the axis of the one member to permit alignment of the coupling device and the other member during coupling. As noted above, in the disclosed form of the invention, the alignment which occurs between the first and second members is the alignment of respective splines on the other member and the coupling device.

The disclosed me and for effecting relative axial movement comprises at least one spring which biases the other member in the direction of the coupling device and the one member for coupling the members, and hydraulic chamber means for accommodating hydraulic fluid to press the other member in a direction away from the coupling device to compress the at least one spring and decouple the members when hydraulic fluid pressure is maintained in the chamber means. As disclosed, the other member is a sliding collar which is nonrotatably connected to a stationary shaft and the one member is a drive shaft which is adapted to be held stationary when the first and second members are coupled to one another by way of the coupling device. This occurs when the at least one spring biases the other member in the direction of the coupling device in the absence of hydraulic fluid pressure to the chamber means.

The method of the invention for coupling and decoupling first and second coaxial members by way of the decoupling device comprises the steps of mounting the coupling device on one of the first and second members by way of means for rotationally positioning the coupling device on the one of the first and second members in a position to allow bidirectional lost rotational motion between the coupling device and the one of the first and second members during coupling, and coupling the first and second coaxial members by way of the coupling device. The step of coupling comprises axially translating at least one of the first and second members toward the other to engage the splines on the other of the first and second members and the coupling device.

These and other objects, features and advantages of the present invention will become more apparent from the following description when taken in connection with the accompanying drawings which show, for purposes of illustration only, one preferred embodiment in accordance with the present invention.

BEST MODE FOR CARRYING OUT THE INVENTION

Figure 2:
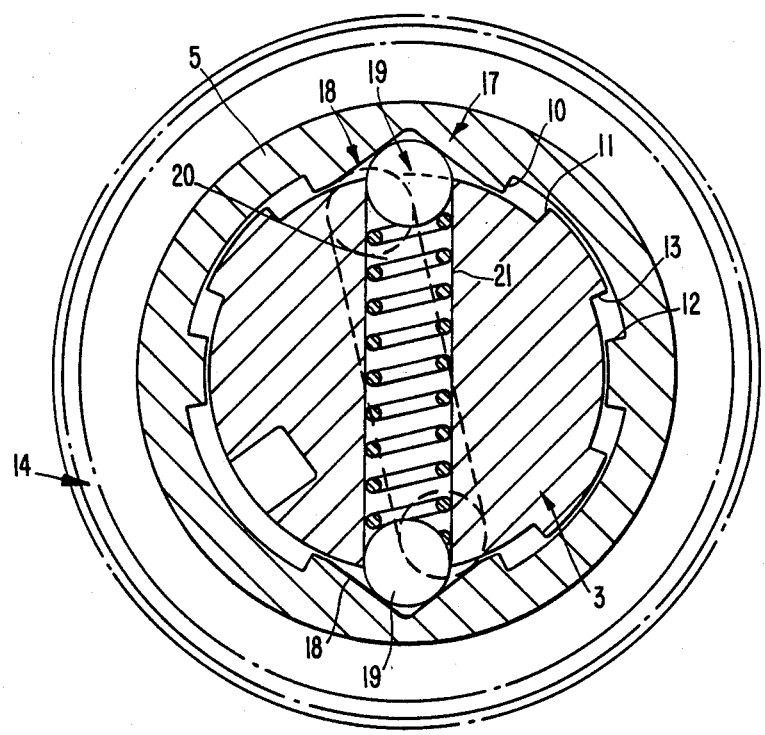
FIG. 2 is a cross-sectional view of the arrangement of FIG. 1 taken along the line A—A in FIG. 1.

Referring now to the drawings, an arrangement 1 according to the invention provides lost motion coupling of two shafts 2 and 3 by way of a coupling device 4. The coupling device 4 comprises an annular lost motion collar 5 which is coaxially supported in a fixed axial position on the shaft 3 by way of centering surface 6 on the shaft and retaining nut 7 on the threaded end of shaft 3 so as to permit relative rotation of the collar 5 and the shaft 3 back and forth about the longitudinal axis 23 of the shafts 2 and 3 between first and second positions. Specifically, as shown in FIG. 2, this limited relative rotation is made possible because the interior of the collar 5 is formed with a coupling spline 9 which receives with clearance the teeth of an exterior spline 8 formed on the shaft 3. This arrangement permits relative rotation of the collar and shaft between a first position where the edges 10 and 11 of the respective teeth of the splines 8 and 9 contact one another, and a second position where the edges 12 and 13 of the teeth of the respective splines 8 and 9 are engaged. The amount of relative rotation between the collar 5 and shaft 3 about axis 23 between these two end positions is at least equal to the width of the spline teeth of a spline 14 provided on the exterior of collar 5. The spline 14 of collar 5 is adapted to be coupled and uncoupled with a corresponding spline 15 formed on the interior of a sliding collar 16 slidably, but nonrotatably connected to shaft 2.

Figure 1:
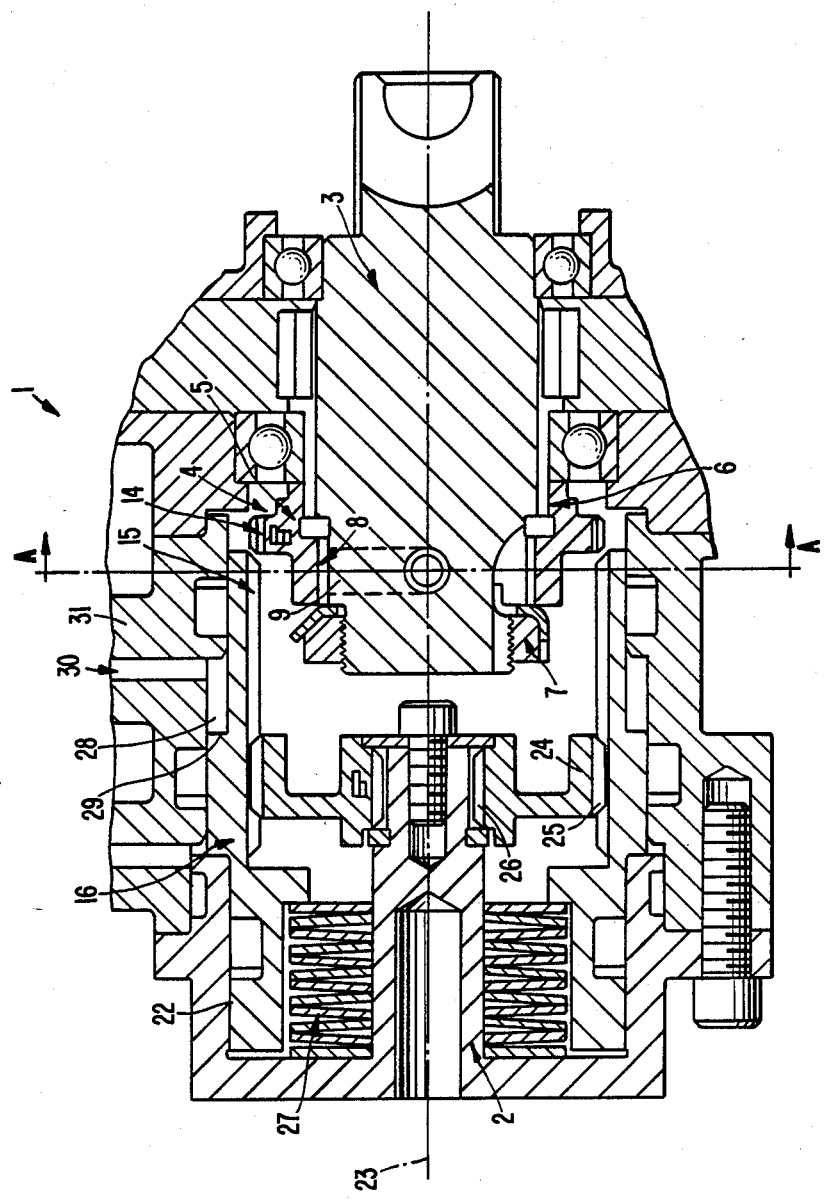
FIG. 1 is a cross-sectional an arrangement for coupling and decoupling first and second coaxial shafts with a coupling device according to the invention, the sectional view being taken along the longitudinal axis of the shafts and the shafts being shown in the decoupled position.

The coupling device 4 further comprises a mechanism 17 for automatically adjusting the relative rotational position of the lost motion collar 5 and the shaft 3 to a position midway between the first and second end positions when the shafts 2 and 3 are decoupled. The mechanism 17 includes a pair of V-shaped ramps 18 formed on opposite sides of the radially inner surfaces of collar 5 and cooperating balls 19 which are resiliently biased towards a respective ramp by a spring 20. The spring 20 and balls 19 are located within a radially directed annular passage 21 in the shaft 3 for telescoping supporting the balls 19 against the interior surface of the collar 5, particularly the ramps 18 formed therein. The spring constant of the spring 20 is selected to provide a sufficient force against the balls 19 for rotating the collar 5 relative to the shaft 3 such that the balls are centered in the bottoms of the V-shaped ramps 18 in the manner shown in FIG. 2. In this position the teeth of the spline 9 are centered within the corresponding recesses of the spline 8 on the interior of the collar 5 as shown in FIG. 2. From this position, upon coupling of the shafts 2 and 3 the collar 5 can rotate relative to the shafts in either direction an equal amount, thereby precluding binding of the spline 14 on the exterior collar 5 and the cooperating spline 15 on the interior of the sliding collar 16. As depicted in FIG. 1, the sliding collar 16 is located in an uncoupled position, to the left of the exterior coupling 14 on the collar 5.

According to the disclosed embodiment, the shaft 2 is a stationary shaft. The collar 16 is mounted within a recess 22 of the shaft for sliding movement relative to the shaft along the longitudinal axis 23 of the shafts 2 and 3. However, the sliding collar 16 is secured against rotation relative to the stationary shaft 2 by means of annular member 24 which has an external spline 25 in engagement with the spline 15 on collar 16, and an internal surface which is coupled to the stationary shaft 2 by way of spline connection 26.

A spring stack 27 yieldably biases the sliding collar 16 to the right in FIG. 1, toward the lost motion collar 5 for coupling the sliding collar and the shaft 3 which, in turn, couples the stationary shaft 2 and shaft 3. A hydraulic chamber 28 defined between collar 16 and a surrounding housing 31 is adapted to receive a high pressure hydraulic fluid through an inlet 30. High pressure fluid in the chamber 28 acts on a surface 29 of the sliding collar 16, for sliding the collar 16 to the left in FIG. 1, to compress the spring stack 27 the splines 14 and 15 on the sliding collar 16 and lost motion collar 5. When there is a loss of hydraulic fluid pressure in the chamber 28, the spring stack 27 slides the collar 16 to the right and couples the shafts 2 and 3 to prevent rotation of shaft 3.

The shaft 3 is a drive shaft in the illustrated embodiment. In one application of the coupling device of the invention, the sliding collar 16 is used to, connect the stationary shaft 2 to the drive shaft 3 to keep a load from moving in case of hydraulic pressure failure in an aircraft hydraulic system. While the spring stack 27 is employed for providing the coupling force, and hydraulic pressure is used against the sliding collar for the decoupling force, other mechanical, electrical or hydraulic arrangements could be used for providing the coupling and decoupling forces.

The coupling process begins when hydraulic pressure is removed and the spring force moves the sliding collar 16 to begin engagement of splines 14 and 15. Because the leading edges of splines 14 and 15 are pointed, the lost motion collar 5 is induced to rotate clockwise or counterclockwise to allow the splines 14 and 15 to line up. The lost motion collar 5 can rotate in either direction at least one-half of a spline tooth width because of the gap between the teeth of the splines 8 and 9 and the action of the centering mechanism 17.

As discussed above, the mechanism 17 automatically maintains the equal gap between the teeth of the splines 8 and 9 by the spring exerting a force on both balls 19 to react them with ramps 18 for centering the teeth of the spline 9 on shaft 3 within the recesses of spline on the interior of lost motion collar 5. The centering or detenting force can be varied by the spring pressure and ramp angle. Concentricity of the lost motion collar 5 within the assembly is important and is accomplished by the centering surface 6 and retaining nut 7.

While I have shown and described only one embodiment in accordance with the present invention, it is understood that the same is not limited thereto, but is susceptible to numerous changes and modifications as known to those skilled in the art. For example, although in the illustrated embodiment the drive shaft is coupled to a stationary shaft, both shafts may rotate. In that case, the sliding collar 16 would be supported on its own bearing system. Therefore, I do not wish to be limited to the details shown and described herein, but intend to cover all such changes and modifications as are encompassed by the scope of the appended claims.

I claim:

1. A coupling device for coupling first and second coaxial members, said coupling device comprising:
an annular member, means for supporting said annular member coaxially on one of first and second coaxial members adapted to be coupled so as to permit relative rotation of said annular member and said one of the first and second members back and forth between first and second positions, and a mechanism located at least partially between the annular member and the one of the first and second members for automatically adjusting the relative rotational position of said annular member and one of said of the first and second positions when said first and second members are decoupled and wherein the annular member has a first surface upon which it is supported with respect to the one of said first and second members and a second, opposite surface having spline teeth for coupling with spline teeth on the other of said first and second members.

2. The coupling device according to claim 1, wherein said annular member is supported on the outer periphery of the one of the first and second members.

3. The coupling device according to claim 1, wherein the distance between said first and second positions is at least equal to the width of said spline teeth.

4. The coupling device according to claim 1, wherein said means for supporting said annular members coaxially on one of the first and second members includes an annular centering surface on said one of the first and second members and a cooperating surface on the annular member.

5. The coupling device according to claim 1, wherein said means for supporting said annular member coaxially on one of the first and second members includes means for axially fixing the position of the annular member with respect to the one of the first and second members.

6. The coupling device according to claim 1, wherein said means for supporting includes a plurality of recesses formed about the circumference of one of said annular member and said one of the first and second members and a plurality of teeth provided on the other of said annular member and one of the first and second members, said teeth being received in said recesses with clearance to permit said relative rotation between the first and second positions.

·7. The coupling device according to claim 1, wherein said mechanism for automatically adjusting the relative rotational position of the annular member and said one of the first and second members comprises at least one ramp formed in one of the annular member and said one of the first and second members and a cooperating ball resiliently biased toward the ramp and supported in the other of the annular member and said one of the first and second members.

8. A coupling device for coupling first and second coaxial members, said coupling device comprising:
an annular member, means for supporting said annular member coaxially on one of first and second coaxial members adapted to be coupled so as to permit relative rotation of said annular member and said one of the first and second members back and forth between first and second positions, and means for automatically adjusting the relative rotational position of said annular member and said one of said of the first and second positions when said first and second members are decoupled, wherein said one of the first and second members is a shaft and the other of the first and second members is a sliding collar adapted to be moved axially with respect to said shaft and the annular member supported thereon for coupling and decoupling the first and second members.

9. An arrangement for coupling and decoupling first and second coaxial members comprising first and second members arranged coaxially and adapted to be coupled and decoupled to one another by way of a coupling device of said arrangement which is connected to one of the first and second members and adapted to be coupled and decoupled with the other member for coupling and decoupling said members to one another, means for effecting relative axial movement of the other member on the one hand and the coupling device and the one member on the other hand for coupling and decoupling the members to one another by way of said coupling device, and means for allowing bi-directional lost rotational motion between said coupling device and the one member to permit alignment of the coupling device and the other during coupling.

10. The arrangement according to claim 9, wherein the other of said members and the coupling device each have splines formed thereon for coupling with one another when said splines are properly aligned with one another.

11. The arrangement according to claim 9, wherein said means for effecting relative axial movement comprises at least one spring biasing said other member in the direction of the coupling device for coupling said members and hydraulic chamber means for accommodating hydraulic fluid to press said other member in a direction away from said coupling device to compress said at least one spring and decouple said members when hydraulic fluid pressure is maintained in said chamber means.

12. The arrangement according to claim 9, wherein the other member is a sliding collar which is non-rotatably connected to a stationary shaft and the one member is a drive shaft which is adapted to be held stationary when said first and second members are coupled to one another by way of the coupling device.

13. The arrangement according to claim 9, wherein said means for allowing bi-directional lost rotational motion comprises at least one ramp in one of the coupling device and said one member of the first and second members and at least one cooperating ball resiliently biased toward the at least one ramp and supported in the other of the coupling device and said one of the first and second members.

14. A method of coupling first and second coaxial members by way of a coupling device comprising the steps of mounting a coupling device on one of the first and second members by way of means for rotationally positioning the coupling device on the one of the first and second members in a position to allow bi-directional lost rotational motion between the coupling device and the one of the first and second members during coupling, and coupling said first and second coaxial members by way of said coupling device, wherein the coupling device and the other of the first and second members are provided with splines thereon, said splines being engaged during said coupling step, and misalignment of said splines being corrected by lost motion of said coupling device relative to the first and second members during coupling and wherein said step of coupling comprises axially translating at least one of said first and second members toward the other to engage said splines.

* * * * *